(12) United States Patent
Yomoda et al.

(10) Patent No.: US 8,979,690 B2
(45) Date of Patent: Mar. 17, 2015

(54) TOOTHED BELT AND METHOD OF MANUFACTURING THE SAME

(75) Inventors: Hidetoshi Yomoda, Okazaki (JP); Takashi Nagase, Nissin (JP); Tatsuya Kitagawa, Toyota (JP); Kazuya Kusu, Osaka (JP); Kiyotaka Miyagai, Neyagawa (JP); Akira Kasuya, Neyagawa (JP)

(73) Assignees: Toyota Jidosha Kabushiki Kaisha, Aichi-ken (JP); Kurashiki Boseki Kabushiki Kaisha, Okayama (JP)

( * ) Notice: Subject to any disclaimer, the term of this patent is extended or adjusted under 35 U.S.C. 154(b) by 285 days.

(21) Appl. No.: 13/699,943

(22) PCT Filed: May 24, 2011

(86) PCT No.: PCT/IB2011/001469
§ 371 (c)(1),
(2), (4) Date: Nov. 26, 2012

(87) PCT Pub. No.: WO2011/148263
PCT Pub. Date: Dec. 1, 2011

(65) Prior Publication Data
US 2013/0072335 A1    Mar. 21, 2013

(30) Foreign Application Priority Data
May 26, 2010   (JP) ................. 2010-120506

(51) Int. Cl.
*F16G 1/28*   (2006.01)
*F16G 5/20*   (2006.01)
(Continued)

(52) U.S. Cl.
CPC *F16G 1/10* (2013.01); *B29D 29/08* (2013.01); *F16G 1/28* (2013.01); *F16G 5/20* (2013.01)
USPC .......................................... 474/205; 474/204

(58) Field of Classification Search
CPC ................ F16G 1/10; F16G 1/28; F16G 5/20
USPC .................................................. 474/204, 205
See application file for complete search history.

(56) References Cited

U.S. PATENT DOCUMENTS 2,167,384 A * 7/1939 Freedlander .................. 474/250
3,353,419 A * 11/1967 Richmond .................... 474/250
(Continued)

FOREIGN PATENT DOCUMENTS

EP     1 580 453 A2   9/2005
GB       670996 A    4/1952
(Continued)

OTHER PUBLICATIONS

International Search Report and Written Opinion for corresponding International Patent Application No. PCT/IB23011/001469 mailed Oct. 7, 2011.

(Continued)

*Primary Examiner* — Henry Liu
(74) *Attorney, Agent, or Firm* — Sughru Mion, PLLC

(57) ABSTRACT

A toothed belt has therein a core wire (3) including a core thread (1) made of aramid fiber and a filament thread (2) made of nylon fiber, and has belt tooth portions (4) and belt groove portions (5) alternately formed therealong. The core wire (3), the belt tooth portions (4), and the belt groove portions (5) are integrated with one another by a rubber material (7). It should be noted herein that the core thread (1) and the filament thread (2) are integrally twined around each other so that the filament thread (2) is formed in the shape of a plurality of loops around the core thread (1). The filament thread (2) in the shape of the loops enters tooth root portions (9) of the belt tooth portions (4) to be arranged therein. As a result, the tooth root portions (9) are strengthened.

9 Claims, 5 Drawing Sheets

(51) Int. Cl.
*F16G 1/10* (2006.01)
*B29D 29/08* (2006.01)

(56) References Cited

U.S. PATENT DOCUMENTS

| | | | |
|---|---|---|---|
| 3,419,449 A * | 12/1968 | Di Valcrio et al. | 156/159 |
| 3,535,946 A * | 10/1970 | Miller | 474/205 |
| 3,820,409 A * | 6/1974 | Meadows | 474/262 |
| 3,853,017 A * | 12/1974 | White et al. | 474/238 |
| 4,188,832 A * | 2/1980 | Henderson | 474/250 |
| 5,230,667 A | 7/1993 | Nakajima et al. | |
| 5,387,160 A * | 2/1995 | Nakajima et al. | 474/205 |
| 5,599,604 A * | 2/1997 | Goettsch et al. | 428/105 |
| 5,971,879 A | 10/1999 | Westhoff | |
| 6,419,605 B1 * | 7/2002 | Takahashi et al. | 474/237 |
| 6,669,592 B2 * | 12/2003 | Hayashi | 474/268 |
| 6,863,761 B2 * | 3/2005 | Knutson | 156/137 |
| 6,964,626 B1 | 11/2005 | Wu et al. | |
| 2006/0154766 A1 | 7/2006 | Lacy et al. | |

FOREIGN PATENT DOCUMENTS

| | | | |
|---|---|---|---|
| JP | 50-69452 A | 6/1975 |
| JP | 62-106043 U1 | 7/1987 |
| JP | 62-136649 U1 | 8/1987 |
| JP | 63-137149 U1 | 9/1988 |
| JP | 05-106689 A | 4/1993 |
| JP | 05-106690 A | 4/1993 |
| JP | 06-337037 A | 12/1994 |
| JP | 07-34365 A | 2/1995 |
| JP | 07-156288 A | 6/1995 |
| JP | 2963085 B2 | 8/1999 |
| JP | 3007418 B2 | 11/1999 |
| JP | 2000-51132 A | 2/2000 |
| JP | 2001-18300 A | 1/2001 |
| JP | 2004-225749 A | 8/2004 |
| JP | 2007-71228 A | 3/2007 |
| JP | 2007-92991 A | 4/2007 |
| JP | 2008-6665 A | 1/2008 |
| JP | 2008-527264 A | 7/2008 |
| SU | 1366744 A1 | 1/1988 |

OTHER PUBLICATIONS

Japanese Office Action for corresponding JP Patent Application No. 2010-120506 issued on Apr. 16, 2012.

* cited by examiner

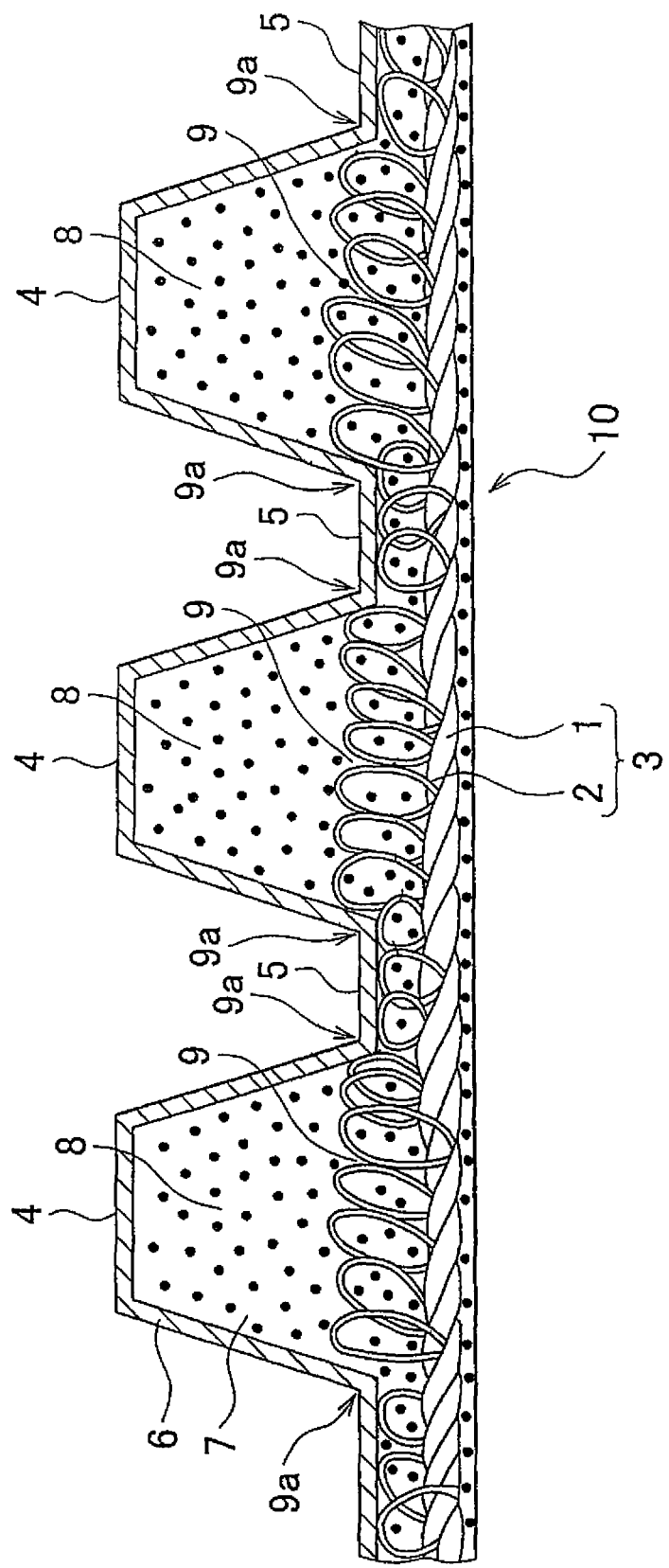

F I G. 3a
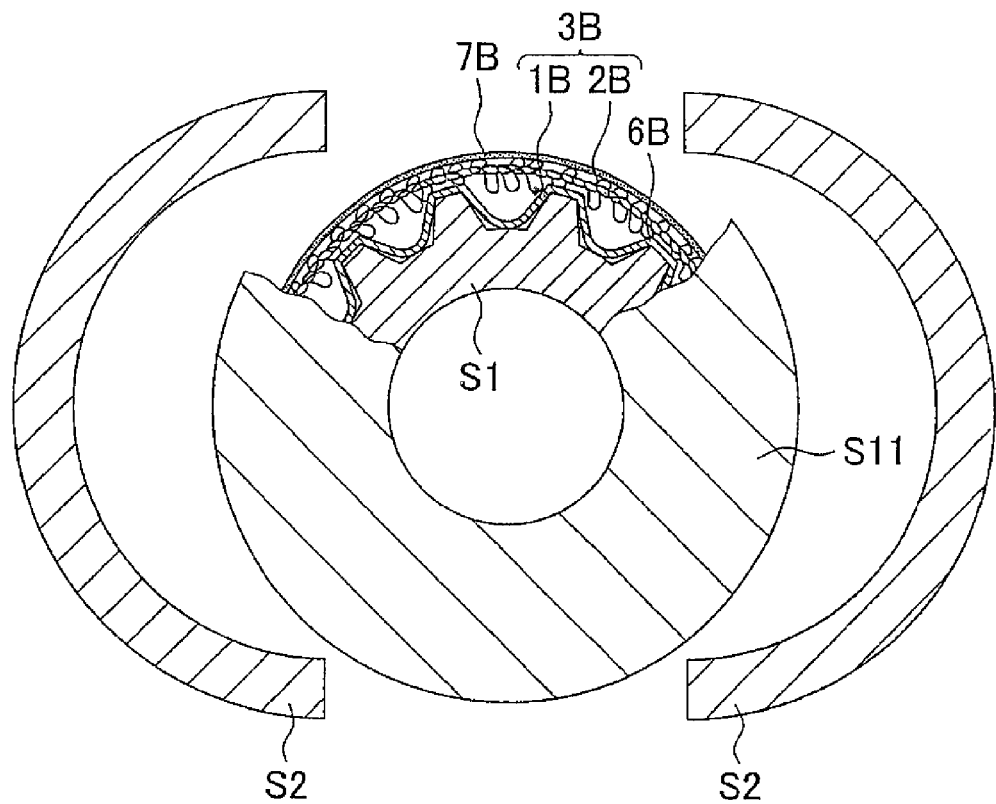
F I G. 3b
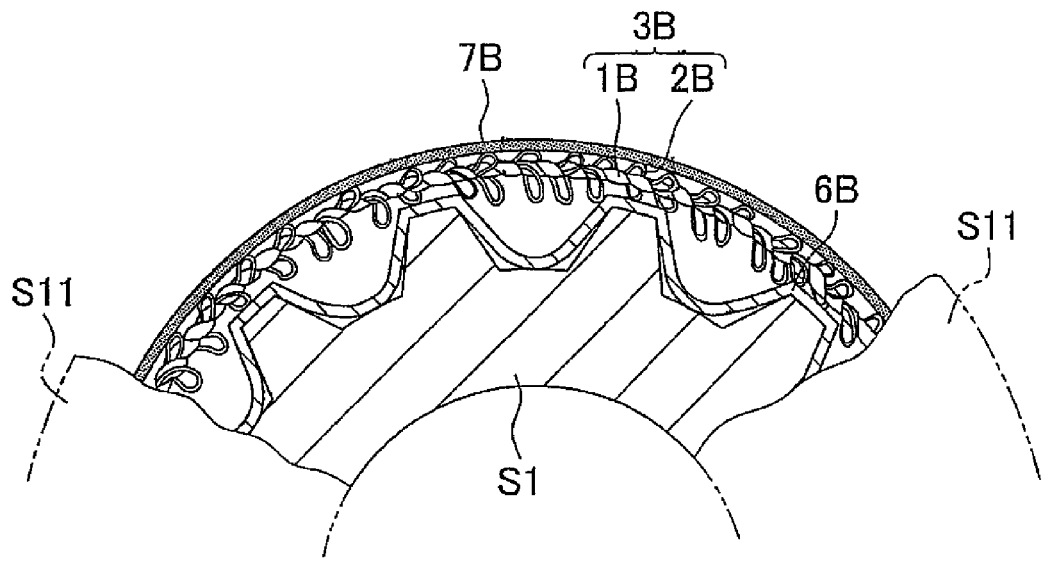

TOOTHED BELT AND METHOD OF MANUFACTURING THE SAME

BACKGROUND OF THE INVENTION

1. Field of the Invention

The invention relates to a toothed belt for power transmission with tooth root portions strengthened by a filament thread twined around a core thread, and a method of manufacturing the toothed belt.

2. Description of the Related Art

Conventionally, for example, a toothed belt is widely adopted as a member for transmitting power between two shafts in a vehicular engine, a machine tool, or the like. In particular, a toothed belt used for an engine is also called "a timing belt".

In general, a toothed belt is formed of synthetic rubber or polyurethane rubber. Being lighter and more flexible than a metallic roller chain, this toothed belt boasts of its low noise level even during rotation, and besides, does not require any lubricating operation. On the other hand, a raw material itself from which the toothed belt is made exhibits low strength, and cuts tend to appear in the toothed belt due to a deterioration of the raw material. Therefore, the toothed belt also faces some problems concerning rigidity and durability.

Thus, in the conventional toothed belt, a core wire made of, for example, glass fiber or aramid fiber is embedded in the toothed belt, and surfaces of belt tooth portions are reinforced by a tooth cloth piece made of nylon woven fabric to restrain the toothed belt from stretching in a longitudinal direction thereof. In this manner, the rigidity of the toothed belt is enhanced as a whole.

Now, the aforementioned conventional toothed belt will be described with reference to FIG. 5. In FIG. 5, belt tooth portions T and belt groove portions D are alternately formed along a toothed belt B. A core wire C obtained by intertwining a plurality of strands of aramid fiber is embedded in the toothed belt B, and a tooth tip-side surface of the toothed belt B is covered with a tooth cloth piece S. The belt tooth portions T, the belt groove portions D, the core wire C, and the tooth cloth piece S are integrally formed by a belt material G.

However, in the aforementioned toothed belt B, when a force F is applied to the belt tooth portions T during power transmission, the belt tooth portions T are so deformed as to tumble in a direction of the force F, and a stress concentrates on boundary portions P of tooth root portions serving as boundaries between the belt tooth portions T and the belt groove portions D respectively. Then, when the stress reaches a predetermined stress, cuts are made in the boundary portions P. Shear fracture progresses from these cuts toward boundary portions Q on the other side of the belt tooth portions T (as indicated by broken lines L), and the belt tooth portions are chipped above the boundary portions Q. Accordingly, it has been desired to develop a toothed belt capable of restraining belt tooth portions from being deformed under a high-load condition as well and effectively inhibiting the belt tooth portions from being damaged.

In view of the aforementioned problem, toothed belts with strengthened tooth root portions are disclosed in Japanese Patent Application Publication No. 50-69452 (JP-A-50-69452), Japanese Utility Model Application Publication No. 63-137149 (JP-U-63-137149), and Japanese Patent Application Publication No. 7-156288 (JP-A-7-156288). In the toothed belt disclosed in Japanese Patent Application Publication No. 50-69452 (JP-A-50-69452), a core wire embedded in the toothed belt is fabricated from a multifilament, and ends of a plurality of filaments of the multifilament are so arranged as to protrude outward from an outer peripheral face of the multifilament to increase an area of adhesion to rubber. As a result, the toothed belt is strengthened as a whole. Further, in the toothed belt disclosed in Japanese Utility Model Application Publication No. 63-137149 (JP-U-63-137149), a core wire for reinforcing belt tooth portions, which has a curved portion to reinforce the belt tooth portions, is embedded together with a core in a belt to strengthen the belt tooth portions. Further, in the toothed belt disclosed in Japanese Patent Application Publication No. 7-156288 (JP-A-7-156288), a nonwoven fabric is press-fitted into tooth root portions using a pressure generated by the winding of a core wire, and discontinuous fiber contained in the nonwoven fabric is diffused to the tooth root portions during molding, so that the tooth root portions of the belt are strengthened.

In the toothed belt disclosed in Japanese Patent Application Publication No. 50-69452 (JP-A-50-69452), the ends of the plurality of the filaments cannot be protruded homogeneously in a longitudinal direction of the toothed belt, and the core wire is inhomogeneous in strength in the longitudinal direction. Thus, the toothed belt is inhomogeneous in strength as a whole. In addition, the multifilament as described above is complicated to fabricate, and causes a steep rise in manufacturing cost. Further, in the toothed belt disclosed in Japanese Utility Model Application Publication No. 63-137149 (JP-U-63-137149), when being fabricated together with (twined around) the core wire, the core wire for reinforcing the belt tooth portions needs to be fabricated in accordance with the pitch and dimension of the belt tooth portions. Furthermore, the core wire for reinforcing the belt tooth portions is arranged along outer peripheral faces of the belt tooth portions, and hence causes an increase in rigidity not only in the tooth root portions, which need to be reinforced, but also in the entire belt tooth portions including tooth tip portions. As a result, new problems such as noise and the like may arise. Further, in the toothed belt disclosed in Japanese Patent Application Publication No. 7-156288 (JP-A-7-156288), the nonwoven fabric needs to be arranged in accordance with the pitch of the belt tooth portions as is the case with the aforementioned Japanese Utility Model Application Publication No. 63-137149 (JP-U-63-137149). Furthermore, it is difficult to control the arrangement of the discontinuous fiber of the nonwoven fabric that is diffused to the belt tooth portions as polyurethane flows during molding. Consequently, the tooth root portions of the toothed belt cannot be effectively strengthened.

SUMMARY OF THE INVENTION

The invention has been made in view of the aforementioned problems, and provides a toothed belt with a core wire that is easy to fabricate and tooth root portions that can be effectively strengthened, and a method of manufacturing the toothed belt.

According to one aspect of the invention, there is provided a toothed belt that has embedded therein a core wire including a core thread and a filament thread and has belt tooth portions and belt groove portions alternately formed therealong. The core thread and the filament thread are twined around each other so that the filament thread is formed in a shape of a plurality of loops around the core thread. The filament thread in the shape of the loops enters tooth root portions of the belt tooth portions so that the core wire, the belt tooth portions, and the belt groove portions are integrated with one another by a belt material to strengthen the tooth root portions.

It should be noted herein that "the core thread" of the invention is a fiber or fiber bundle exhibiting high heat resistance and high rigidity and serving to maintain the rigidity of the core wire in a longitudinal direction. For example, para-aramid fiber, meta-aramid fiber, wholly aromatic polyester fiber, super high molecular weight polyester fiber, carbon fiber, glass fiber, metal fiber, and the like can be used as the core thread.

Further, "the filament thread" of the invention is a fiber or fiber bundle integrally twined around the aforementioned fiber or fiber bundle of the core thread, and is formed in a looped manner around the core thread. In addition to the fibers of the core thread described already, for example, synthetic fibers such as polyester, nylon, polypropylene, and the like, regenerated fibers such as rayon and the like, natural fibers such as cotton, silk, and the like can also be used as the filament thread. It should be noted herein that the looped filament thread (the looped fiber) is preferably flexible enough to be guided in a flow direction of a molten belt raw material as will be described later.

Further, as an example of the belt material of the invention, rubber or polyurethane resin, which exhibits higher rigidity than rubber, can be used.

It should be noted that the aforementioned core thread of the invention and the aforementioned filament thread of the invention are preferably made of a fiber having a melting point equal to or higher than a vulcanizing temperature of rubber or a fiber having a melting point equal to or higher than a curing temperature of polyurethane resin.

According to the toothed belt as described above, the looped filament thread twined around the core thread enters the tooth root portions of the belt tooth portions, and is integrated therewith by the belt material. In the tooth root portions, the filament thread is arranged substantially homogeneously in the longitudinal direction of the toothed belt. Thus, the tooth root portions can be effectively strengthened over an entire range thereof, while inhibiting tooth tip portions from increasing in rigidity. Further, in the core wire, there is no need to form the looped filament thread in accordance with the pitch of the belt tooth portions. Therefore, the core wire is easy to fabricate.

Further, it is also preferable that the core thread and the filament thread be adhesively joined to each other by an adhesive thread. In this case, the core thread and the filament thread can be inhibited from coming apart from each other. For example, when a commercial thermally adhesive thread (referred to also as "a melter") made of low-melting nylon with a melting point of about 110 to 130° C., low-melting polyester with a melting point of about 160 to 180° C., or core-in-sheath fiber using polymer with a sheath portion having a lower melting point than a core portion is used as the adhesive thread and the thermally adhesive thread twined around the core thread and the filament thread is melted under a high-temperature atmosphere to adhesively join the core thread and the filament thread to each other, the core thread and the filament thread can thereby be reliably prevented from coming apart from each other until the core wire is wound around a molding tool. It should be noted that the thermally adhesive thread may be fed to either the core thread side or the filament thread side, or to both the core thread side and the filament thread side. Furthermore, this adhesive thread can also be used as the filament thread itself.

According to another aspect of the invention, there is provided a method of manufacturing a toothed belt that has embedded therein a core wire including a core thread and a filament thread and has belt tooth portions and belt groove portions alternately formed therealong. This method includes a first step of preparing a core wire obtained by twining the core thread and the filament thread around each other such that the filament thread is formed in a shape of a plurality of loops around the core thread, a second step of arranging a belt raw material in close contact with the core wire, and a third step of melting the belt raw material under a high-temperature atmosphere and integrating the core wire, the belt tooth portions, and the belt groove portions by a belt material to form the belt tooth portions and the belt groove portions. The filament thread in the shape of the loops enters tooth root portions of the belt tooth portions to form the belt tooth portions and strengthen the tooth root portions in the third step.

According to the method of manufacturing the toothed belt as described above, first of all in the first step, the core wire can be prepared by twining the filament thread in a looped manner around the core thread without being affected by the pitch of the belt tooth portions. It should be noted that the size (loop diameter, loop dimension and the like) of the looped filament thread is preferably set such that the looped filament thread is arranged in the tooth root portions, which need to be reinforced. Then, by arranging the belt raw material in close contact with the core wire in the second step and melting the belt raw material under the high-temperature atmosphere in the third step, the looped filament thread is also pressed into these tooth root portions of the belt tooth portions due to the pressure of the belt raw material melting and flowing to the tooth root portions. The belt raw material then cures, and the filament thread and the tooth root portions are integrated by the belt material, so that the belt tooth portions with their tooth root portions strengthened by the filament thread are formed. The looped filament thread that has thus entered the tooth root portions is arranged substantially homogeneously in the longitudinal direction of the toothed belt. Therefore, the rigidity of tooth tip portions can be inhibited from increasing, and the tooth root portions can be effectively strengthened over an entire range thereof.

Further, it is preferable that the filament thread formed in the shape of the loops around the core thread be guided to the tooth root portion sides of the core thread through melting of the belt raw material in the third step.

According to the manufacturing method as described above, when the looped filament thread is flexible enough to be guided in a flow direction of the molten belt raw material, it is possible to arrange this filament thread on the tooth root portion sides in a concentrated manner. As a result, the tooth root portions can further be strengthened.

Further, it is also preferable that the core thread and the filament thread, which are twined around each other, be adhesively joined to each other by an adhesive thread in the first step. According to this manufacturing method, the core thread and the filament thread can be reliably prevented from coming apart from each other until the core wire is wound around a molding tool.

The toothed belt obtained through the manufacturing method according to the invention has the belt tooth portions formed through the entrance of the looped filament thread into the tooth root portions of the belt tooth portions, and thus serves as a toothed belt with strengthened tooth root portions. Further, the core wire used in the invention is unsusceptible to the pitch or the like of the belt tooth portions, and hence is easy to fabricate. Further, owing to the method of manufacturing the toothed belt according to the invention, the looped filament thread formed around the core thread can be so arranged as to be oriented toward the core thread on the tooth root portion sides through a pressure received from the belt raw material that has melted and flowed. As a result, the tooth root portions of the belt tooth portions can further be strengthened.

As can be understood from the foregoing description, the toothed belt and the method of manufacturing the toothed belt according to the invention make it possible to provide a toothed belt that allows a core wire constituting the toothed belt to be fabricated with ease, can suppress the generation of noise and the like, and is restrained from being damaged due to strengthened tooth root portions of belt tooth portions.

BRIEF DESCRIPTION OF THE DRAWINGS

The features, advantages, and technical and industrial significance of this invention will be described in the following detailed description of an example embodiment of the invention with reference to the accompanying drawings, in which like numerals denote like elements, and wherein:

FIG. 1 is a longitudinal sectional view showing a toothed belt according to the invention;

FIG. 2b is a view from a direction indicated by arrows B-B of FIG. 2a;

FIG. 3a is a view explaining a step of manufacturing the toothed belt, more specifically, a step of arranging the core wire and a belt raw material in a fixed mold;

FIG. 3b is a view explaining part of FIG. 3a on an enlarged scale;

DETAILED DESCRIPTION OF EMBODIMENT

Figure 2A:
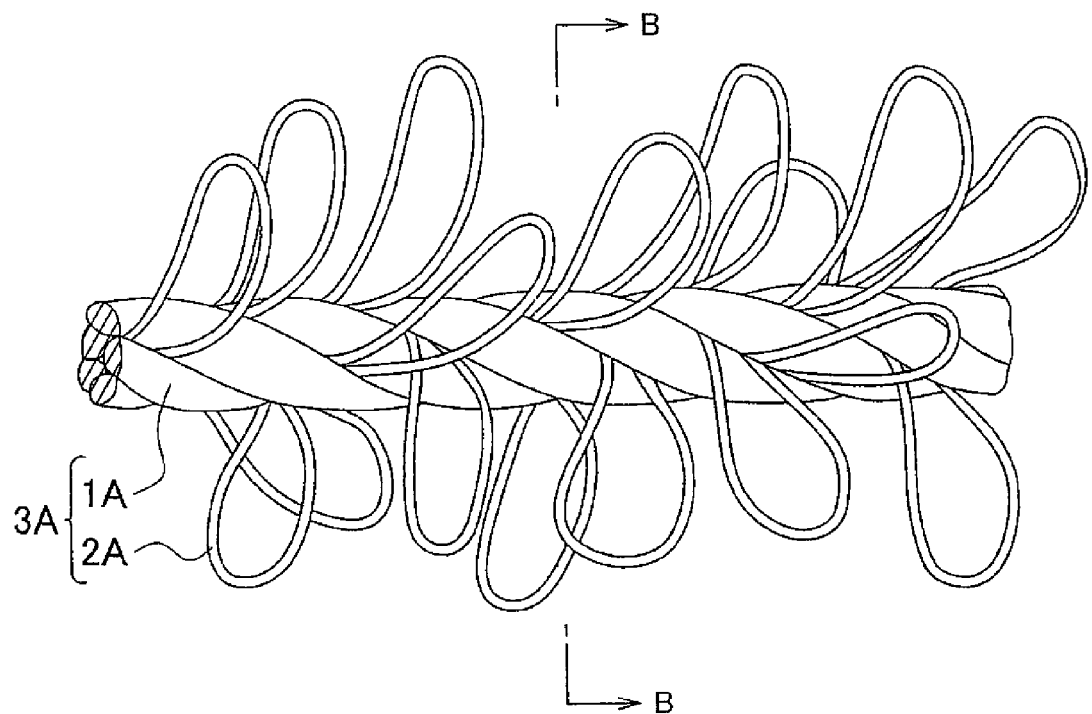
FIG. 2a is a lateral view showing a core wire for manufacturing the toothed belt according to the invention.
Figure 2B:
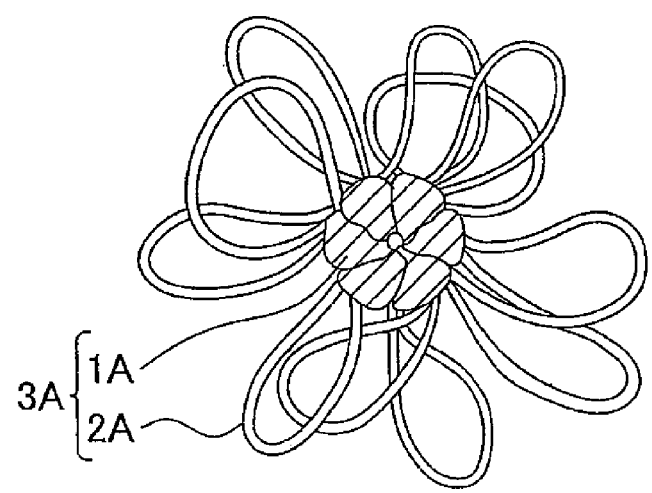

The embodiment of the invention will be described hereinafter with reference to the drawings. FIG. 1 is a view showing a toothed belt according to the invention. Further, FIGS. 2a, 2b are views showing a core wire for manufacturing the toothed belt according to the invention, and FIGS. 3a and 3b and FIGS. 4a and 4b are views showing steps of manufacturing the toothed belt using the core wire shown in FIGS. 2a and 2b.

A toothed belt 10 shown in FIG. 1 has therein core wires 3 including core threads 1 made of aramid fiber and filament threads 2 made of nylon fiber, and has belt tooth portions 4 and belt groove portions 5 alternately formed therealong. The core wires 3, the belt tooth portions 4, and the belt groove portions 5 are integrated with one another by a belt material 7, and the toothed belt 10 is thereby constructed to a large extent. It should be noted herein that rubber or polyurethane resin is used as the belt material, but rubber is adopted in this embodiment of the invention. Therefore, the belt material will be described below as a rubber material 7. In this case, each of the core threads 1 and a corresponding one of the filament threads 2 are integrally twined around each other, so that each of the filament threads 2 is formed in the shape of a plurality of loops around a corresponding one of the core threads 1. The core threads 1 and the filament threads 2 are adhesively joined together by adhesive threads (not shown) respectively. It should be noted that the filament threads 2 are also referred to as "looped strands of fiber" because of the shape thereof. Further, a tooth cloth piece 6 is arranged on surfaces of the belt tooth portions 4 and the belt groove portions 5 to reinforce a surface of the belt. As a result, the rigidity of the belt is also enhanced as a whole. It should be noted that a plurality of the aforementioned core wires 3 are provided inside the toothed belt 10, and are embedded in the toothed belt 10 apart from one another in a width direction thereof.

The aforementioned belt tooth portions 4 can be broadly classified into tooth tip portions 8 located in the vicinity of tips of teeth of the belt tooth portions, and tooth root portions 9 located close to the core wires 3 of the belt tooth portions. In each of boundary portions 9a serving as boundaries between the belt tooth portions 4 and the belt groove portions 5, when a force is applied to a corresponding one of the belt tooth portions 4 during the rotation of the toothed belt 10, the belt tooth portion 4 is so deformed as to be inclined in the direction of the force, so that a stress may concentrate on the boundary portion 9a. Thus, in the toothed belt 10 according to the invention, the looped filament threads 2 enter the tooth root portions 9, and the entire belt is integrated by the rubber material 7. The looped filament threads 2 are substantially homogeneously arranged over entire ranges of the tooth root portions 9 in a longitudinal direction of the toothed belt. The filament threads 2 thereby function as reinforcing materials capable of restraining the tooth root portions 9 from being deformed. Accordingly, stresses can be restrained from concentrating on the boundary portions 9a, and the belt tooth portions 4 can be inhibited from being damaged. Further, the loops of the filament threads 2 do not exist in the tooth tip portions 8. Therefore, the generation of noise and the like during rotation can be avoided by restraining the tooth tip portions 8 from increasing in rigidity.

Figure 4A:
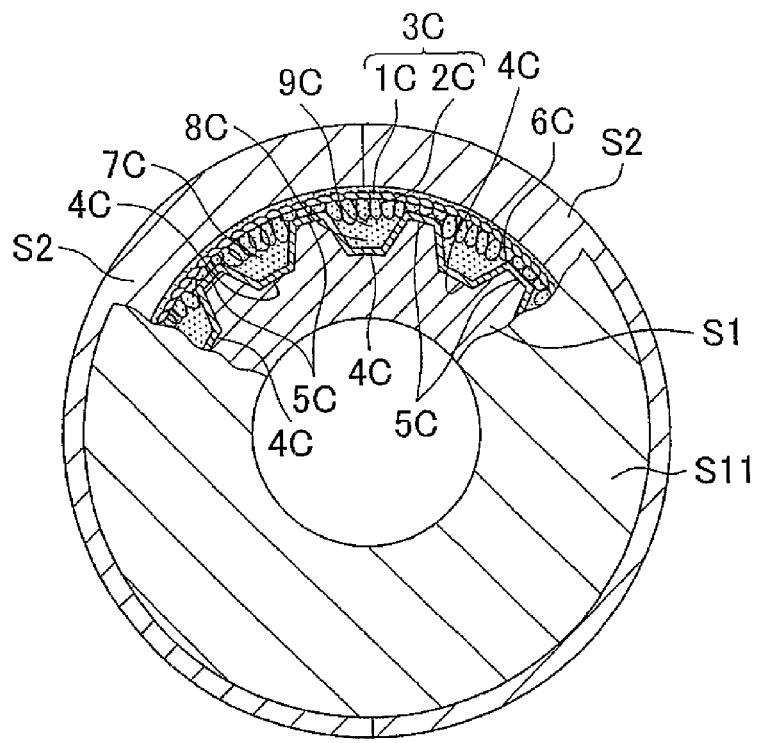
FIG. 4a is a view explaining a step of manufacturing the toothed belt subsequently to FIGS. 3a and 3b, more specifically, a step of melting the belt raw material under a high-temperature atmosphere.
Figure 4B:
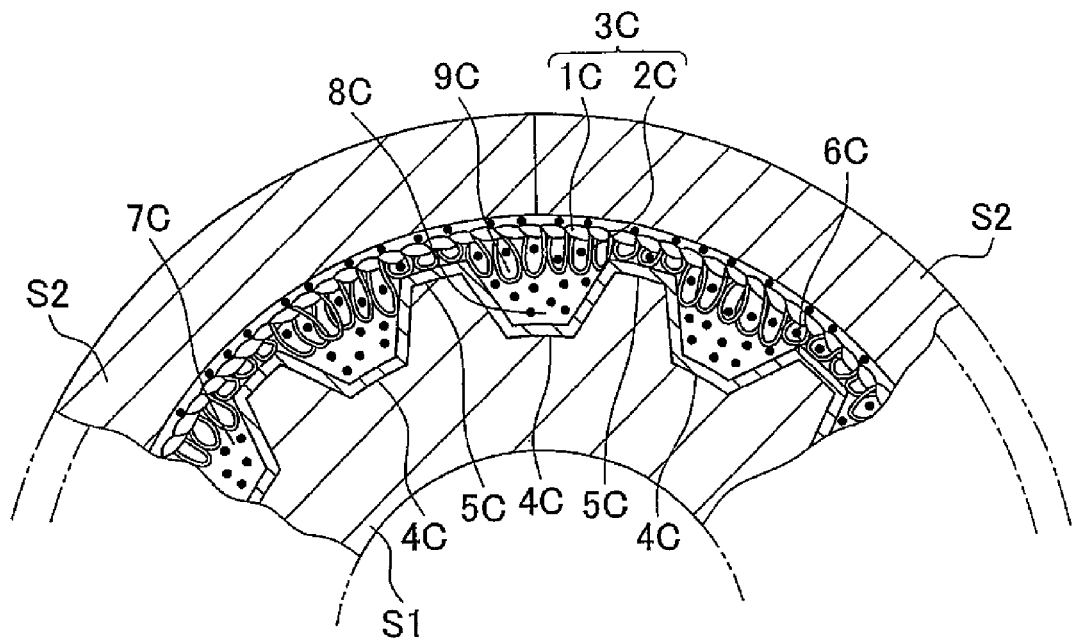
FIG. 4b is a view explaining part of FIG. 4a on an enlarged scale.
Figure 5:
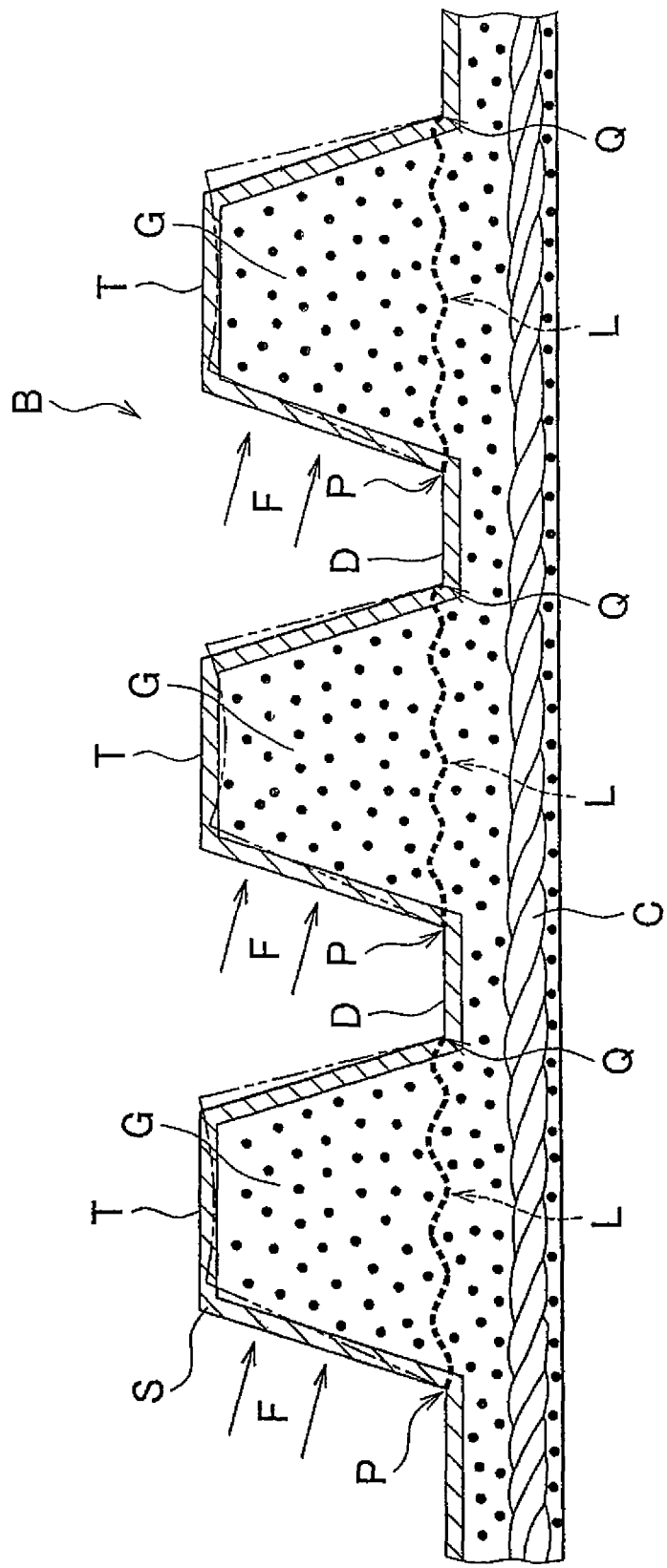
FIG. 5 is a longitudinal sectional view showing a toothed belt having a conventional structure.

Next, the steps of manufacturing the toothed belt according to the invention will be described with reference to FIGS. 2a, 2b to 4a, 4b. FIG. 2a is a lateral view showing a core wire prepared to manufacture the toothed belt according to the invention, and FIG. 2b is a view from a direction indicated by arrows B-B of FIG. 2a. Further, FIG. 3a is a view explaining a step of arranging a tooth cloth piece, the core wire, and a belt raw material in a fixed mold, and FIG. 3b is an enlarged view of part of FIG. 3a. Further, FIG. 4a is a view explaining a step of melting the belt raw material under a high-temperature atmosphere to mold the toothed belt, and FIG. 4b is an enlarged view of part of FIG. 4a.

First of all, in manufacturing the toothed belt, a core wire 3A including of a core thread 1A and a filament thread 2A as shown in FIG. 2a is prepared. It should be noted herein that the core thread 1A is a twine made of a plurality of strands of aramid fiber, and that the filament thread 2A is made of nylon fiber. It should be noted that the types of those fibers and the cardinal numbers, thicknesses and the like of the strands of the fibers to be intertwined are not limited to those shown in the illustrated example, but can be changed in accordance with a desired strength or the like.

In fabricating the aforementioned core wire 3A, when the plurality of the strands of aramid fiber are intertwined to fabricate the core thread 1A, the filament thread 2A made of nylon fiber is twined in the shape of loops around the core thread 1A. As a result, the core wire 3A including the core thread 1A and the filament thread 2A that are integrated with each other is fabricated. Accordingly, as shown in FIG. 2b, the filament thread 2A in the shape of the plurality of the loops (the looped strands of fiber) is substantially homogeneously arranged around the core thread 1A.

It should be noted herein that in fabricating the core wire 3A, it is preferable that a thermally adhesive thread made of, for example, low-melting nylon fiber and having a melting point at least lower than that of the core thread be twined together with the core thread and the filament thread. The core wire including the core thread, the filament thread, and the thermally adhesive thread is installed under a high-temperature atmosphere, whose temperature is equal to or higher than a melting point of the thermally adhesive thread and at least equal to or lower than a melting point of the core thread, to melt the thermally adhesive thread, and the core wire is cooled again to a room temperature to cure an adhesive of the thermally adhesive thread. The core thread and the filament thread can thereby be adhesively secured to each other. Accordingly, the core thread and the filament thread, which are intertwined to be integrated with each other, can be more reliably inhibited from coming apart from each other.

As a method of fabricating the aforementioned core wire 3A, the following method can be mentioned. First of all, the filament thread is supplied in a rotating or swinging manner to a funnel-shaped waist gauge. The filament thread and the thermally adhesive thread are supplied such that at least part of the filament thread is clamped by the waist gauge. It should be noted herein that the waist gauge is a funnel-shaped instrument with an upper portion opening upward and a narrowed lower portion constituting an outlet. A thread can be supplied by being dropped onto the upper portion of the waist gauge. Since the lower portion of the waist gauge is narrowed, the supplied thread can be temporarily stored in the vicinity of the outlet thereof. Subsequently, the filament thread, the core thread, and the thermally adhesive thread are intertwined by a throwing machine to fabricate the core wire. It should be noted that the core wire is fabricated by being substantially thrown by the throwing machine. That is, the throwing machine has at least a bobbin, a ring, and a traveler. The bobbin is driven by a motor to rotate, and the ring and the traveler, which are incorporated around the bobbin, rotate with a delay with respect to the rotation of the bobbin. The core wire moving past the traveler to be wound around the bobbin is thereby substantially thrown. Then, by being subjected to a thermal treatment for a period from about one second to about 20 minutes under an atmosphere of, for example, 90 to 180° C., at which the low-melting core thread fuses, the core thread and the filament thread are adhesively joined to each other by the thermally adhesive thread. As a result, the filament thread in the shape of the plurality of the loops is substantially homogeneously arranged, and the core wire including the core thread and the filament thread that are adhesively secured to each other is fabricated. It should be noted that pressurization is preferably carried out at a pressure equal to or higher than 1 kg/cm$^2$ in a step of the aforementioned thermal treatment.

Subsequently, a molding tool (a die) including a movable mold S2 and a cylindrical fixed mold S1 having a toothed outer peripheral face as shown in FIG. 3a is prepared. It should be noted that flat plates S11 for positioning the movable mold S2 are provided on an upper face of the fixed mold S1 and a lower face of the fixed mold S1 respectively. In FIG. 3a, part of one of the flat plates S11 is notched to make the inside of the fixed mold S1 visible. Further, a tooth cloth sheet made of a nylon woven fabric adhesive to rubber is cut in advance to a desired dimension, and ends of the tooth cloth sheet are sewn together. Thus, a cylindrical tooth cloth piece is prepared.

As shown in FIG. 3a, a cylindrical tooth cloth piece 6B obtained by sewing the ends together as described above is so fitted to the fixed mold S1 as to cover the outer peripheral face thereof. The core wire 3B prepared in FIGS. 2a and 2b is then spirally wound around the tooth cloth piece 6B. Furthermore, a rubber raw material 7B as a belt raw material in the shape of a flat plate cut in advance to a desired dimension is wound around the core wire 3B.

In this step, as shown in FIG. 3b, the looped filament thread 2B twined around the core thread 1B is substantially homogeneously arranged on an inner peripheral face side of the core thread 1B (the fixed mold S1 side) and an outer peripheral face side of the core thread 1B.

Then, as shown in FIG. 4a, a periphery of the rubber raw material 7B wound around the fixed mold S1 is covered with the movable mold S2, and the fixed mold S1 and the movable mold S2 are moved to a vulcanizing step to melt the rubber raw material 7B under a high-temperature atmosphere.

In the aforementioned step, a rubber raw material 7C as the molten belt raw material moves past a core wire 3C spirally wound around the fixed mold S1, and flows from the movable mold S2 toward the fixed mold S1. Due to a pressure of the molten rubber raw material 7C, a looped filament thread 2C is oriented toward a tooth root portion 9C side of a core thread 1C. The looped filament thread 2C formed around the core thread 1C is pressed into the tooth root portion 9C of a belt tooth portion 4C.

Furthermore, as shown in FIG. 4b, the looped filament thread formed on the outer peripheral face side of the core thread in FIG. 3b is also oriented toward the tooth root portion 9C side of the belt tooth portion 4C due to the pressure of the molten rubber raw material 7C. In consequence, the looped filament thread 2C is arranged in a concentrated manner in the tooth root portion 9C of the belt tooth portion 4C. Accordingly, the density of the looped filament thread 2C in the tooth root portion 9C increases, so that the tooth root portion can further be strengthened. It should be noted that the looped filament thread 2C is arranged on the inner peripheral face side of the core thread 1C in a belt groove portion 5C as well as shown in FIG. 4b.

It should be noted herein that the aforementioned core wire allows the looped filament thread to be arranged in the tooth root portion of the belt tooth portion even when the belt tooth portion and the core wire change in position. Accordingly, there is no need to design the core wire in accordance with the pitch of the belt tooth portions. Therefore, the core wire can be fabricated with ease.

When the molten rubber raw material 7C reaches the tooth cloth piece 4C fitted to the fixed mold S1 and then adheres to the tooth cloth piece 6C, the rubber raw material 7C and the tooth cloth piece 6C are cooled to a room temperature state. The molten rubber raw material then cures. Thus, the core wire 3C, the belt tooth portion 4C, the belt groove portion 5C, and the tooth cloth piece 6C are integrated by rubber. The looped filament thread 2C is arranged in the tooth root portion 9C substantially homogeneously in the longitudinal direction of the belt. As a result, the toothed belt with the strengthened tooth root portion 9C is formed.

It should be noted that a back face of a molded article of the previously-mentioned toothed belt is subjected to a surface treatment through polish after the molded article is removed from the molds, that a lot number and the like are printed on the back face, and that the molded article is cut to a desired width by a roll cutter or the like.

As described above, the toothed belt with the strengthened tooth root portion can be manufactured through the entrance of the looped filament thread into the tooth root portion. Further, the rigidity of the belt tooth portions can be controlled by changing the material, loop diameter, loop dimension, cardinal number, and the like of the filament threads.

It should be noted that the core wires according to the foregoing embodiment of the invention may be designed such that the looped filament threads are arranged densely at positions corresponding to the belt tooth portions and sparsely at positions corresponding to the belt groove portions.

Although the embodiment of the invention has been described above in detail using the drawings, the invention should not be limited in concrete construction to this embodiment thereof. Even when design changes and the like are made without departing from the gist of the invention, they are included in the invention.

The invention claimed is:

1. A toothed belt that has embedded therein a core wire including a core thread and a filament thread and has belt tooth portions and belt groove portions alternately formed therealong,
   the core thread and the filament thread are twined around each other so that the filament thread is formed in a shape of a plurality of loops around the core thread, and
   the filament thread in the shape of the loops enters tooth root portions of the belt tooth portions so that the core wire, the belt tooth portions, and the belt groove portions are integrated by a belt material to strengthen the tooth root portions, and tooth tip portions are located on an inner peripheral face side of the core wire, wherein
   the looped filament thread is arranged on the inner peripheral face side of the core thread in belt groove portions.

2. The toothed belt according to claim 1, wherein the filament thread is continuous along the core wire.

3. The toothed belt according to claim 1, wherein the core thread and the filament thread are adhesively joined to each other by an adhesive thread.

4. The toothed belt according to claim 1, wherein the belt material is made of rubber or polyurethane resin.

5. The toothed belt according to claim 4, wherein the core thread and the filament thread are made of a fiber having a melting point equal to or higher than a vulcanizing temperature of rubber or a fiber having a melting point equal to or higher than a curing temperature of polyurethane resin.

6. A method of manufacturing a toothed belt that has embedded therein a core wire including a core thread and a filament thread and has belt tooth portions and belt groove portions alternately formed therealong, comprising:
   a first step of preparing a core wire obtained by twining the core thread and the filament thread around each other such that the filament thread is formed in a shape of a plurality of loops around the core thread;
   a second step of arranging a belt raw material in close contact with the core wire; and
   a third step of melting the belt raw material under a high-temperature atmosphere and integrating the core wire, the belt tooth portions, and the belt groove portions by a belt material to form the belt tooth portions and the belt groove portions and tooth tip portions are located on an inner peripheral face side of the core wire, wherein
   the filament thread in the shape of the loops enters tooth root portions of the belt tooth portions to form the belt tooth portions and strengthen the tooth root portions in the third step, wherein
   the looped filament thread is arranged on the inner peripheral face side of the core thread in belt groove portions.

7. The method of manufacturing the toothed belt according to claim 6, wherein the filament thread is continuous along the core wire.

8. The method of manufacturing the toothed belt according to claim 6, wherein the filament thread formed in the shape of the loops around the core thread is guided to the tooth root portion sides of the core thread through melting of the belt raw material in the third step.

9. The method of manufacturing the toothed belt according to claim 6, wherein the core thread and the filament thread, which are twined around each other, are adhesively joined to each other by an adhesive thread in the first step.

* * * * *